(12) United States Patent
Tonegawa

(10) Patent No.: US 7,394,560 B2
(45) Date of Patent: Jul. 1, 2008

(54) IMAGE PROCESSING APPARATUS, CONTROL METHOD THEREFOR, AND PROGRAM

(75) Inventor: Nobuyuki Tonegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 712 days.

(21) Appl. No.: 10/943,024

(22) Filed: Sep. 17, 2004

(65) Prior Publication Data

US 2005/0068561 A1 Mar. 31, 2005

(30) Foreign Application Priority Data

Sep. 29, 2003 (JP) ............................. 2003-337978

(51) Int. Cl.
*H04N 1/40* (2006.01)
(52) U.S. Cl. ....................... 358/1.15; 358/1.9
(58) Field of Classification Search ................. 358/1.9, 358/2.1, 1.15–1.18, 537
See application file for complete search history.

(56) References Cited

U.S. PATENT DOCUMENTS 5,218,539 A * 6/1993 Elphick et al. .............. 715/531
5,404,294 A * 4/1995 Karnik ....................... 715/507
6,983,417 B2 1/2006 Kagimasa et al. ........... 715/530

FOREIGN PATENT DOCUMENTS

| EP | 0863658 A2 | 9/1998 |
|---|---|---|
| JP | 10-308868 A | 11/1998 |
| JP | 2002-183125 | 6/2002 |
| JP | 2003-85389 | 3/2003 |

* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

In an image processing apparatus which executes a process for document data in a data management unit that manages, as the document data, at least one of application data created by application software and image data converted into a predetermined format on the basis of the application data, an operation window containing document information on the document data managed in the data management unit and a designation unit for designating editing operation to the document data is displayed. When editing operation to the document data for which the application data and image data are managed as the document data is designated via the designation unit in the operation window, notification information representing information on consistency/inconsistency between the application data and the image data is output.

18 Claims, 16 Drawing Sheets

IMAGE PROCESSING APPARATUS, CONTROL METHOD THEREFOR, AND PROGRAM

FIELD OF THE INVENTION

The present invention relates to an image processing apparatus which executes a process for data in a data management unit that manages at least one of data created or editable by application software and image data converted into a predetermined format on the basis of the data, a control method therefor, and a program.

BACKGROUND OF THE INVENTION

Along with recent spread of computers, materials used in the office are created by an application program such as a wordprocessor or spreadsheet software installed in a computer. Generally, data (to be referred to as application data hereinafter) created by the application program is printed by a printer. To distribute the printed material as a distribution material, the printed material is copied by a necessary number, and the copies are distributed at a meeting or the like.

Distributed materials are bound and physically saved by a binder or the like, or digitally managed by an electronic filing apparatus.

In some cases, application data are managed by a common file server or database software to share information.

A material is often distributed by copying a material which is printed first. Also, a distributed material is often copied and redistributed.

When a distributed material as a printed material is repetitively copied, the image quality of an image serving as the contents of the distributed material degrades, resulting in a poor image. Especially when a color original is distributed, it is copied in monochrome at a very low image quality in most cases because a color copying machine is expensive and is not popular.

In this situation, there is proposed a technique of registering image data in a storage device such as a HDD (Hard Disk Drive), adding a document ID in printing the image data, searching for the registered image data again on the basis of the printed document ID, and outputting the image data (Japanese Patent Laid-Open No. 10-308868).

When image data is registered, like Japanese Patent Laid-Open No. 10-308868, the data can be printed or FAX-transmitted without any problem. However, it becomes difficult to process image data in subsequent reuse or correct part of the image data.

In order to avoid this problem, the present applicant has proposed a technique of managing, in a database, application data and image data obtained by rasterizing the application data. Application data or corresponding image data is selected in accordance with the intended use, and printed or transmitted.

When both application data and corresponding image data are managed in the database in association with each other, and one of the data undergoes editing operation such as deletion, composition with another application data or image data, insertion of another application data or image data, or the like, the contents of the originally managed application data and those of the corresponding image data may not coincide with each other.

If the user who does not know that the contents of the application data and corresponding image data managed in the database do not coincide with each other selects and prints or transmits one of the data, data of contents not intended by the user may be printed or transmitted, impairing operability.

SUMMARY OF THE INVENTION

The present invention has been made to overcome the conventional drawbacks, and has as its object to provide an image processing apparatus capable of improving operability for data in a system in which data created or editable by application software and corresponding image data are managed in association with each other, a control method therefor, and a program.

According to the present invention, the foregoing object is attained by providing an image processing apparatus which executes a process for document data in a data management unit that manages, as the document data, at least one of application data created by application software and image data converted into a predetermined format on the basis of the application data, the apparatus comprising:

a display unit, adapted to display an operation screen containing document information on the document data managed in the data management unit and a designation portion for designating editing operation to the document data; and an output unit, adapted to, when editing operation to the document data for which the application data and the image data are managed as the document data is designated via the designation portion in the operation screen, output notification information representing information on consistency/inconsistency between the application data and the image data.

In a preferred embodiment, the output unit further outputs together with the notification information an application data operation screen for operating the application data.

In a preferred embodiment, the apparatus further comprises a storage unit adapted to store the data management unit.

In a preferred embodiment, the apparatus further comprises an external terminal which is connected via a network and stores the data management unit.

In a preferred embodiment, the apparatus further comprises a registration unit adapted to register the application data and the image data in the data management unit in correspondence with a specific index.

In a preferred embodiment, the apparatus further comprises:

an external terminal which is connected via a network and stores the data management unit; and a registration unit adapted to register the application data and the image data via a network in the data management unit in correspondence with a specific index.

In a preferred embodiment, the document information contains presence/absence of the application data corresponding to the document data, presence/absence of the image data, and when both the application data and the image data exist, consistency/inconsistency between the application data and the image data.

In a preferred embodiment, the apparatus further comprises an inhibition unit adapted to inhibit operation of the designation portion on the basis of document information on document data to be processed in the operation screen.

In a preferred embodiment, the inhibition unit controls a display form of the designation portion on the basis of the document information on the document data to be processed in the operation screen.

In a preferred embodiment, the apparatus further comprises an editing unit adapted to, when either of the application data and the image data is edited on the basis of the editing operation, edit the other data so as to make the other data consistent with the edited data.

According to the present invention, the foregoing object is attained by providing a method of controlling an image processing apparatus which executes a process for document data in a data management unit that manages, as the document data, at least one of application data created by application software and image data converted into a predetermined format on the basis of the application data, the method comprising:

a display step of displaying on a display unit an operation screen containing document information on the document data managed in the data management unit and a designation portion for designating editing operation to the document data; and an output step of, when editing operation to the document data for which the application data and the image data are managed as the document data is designated via the designation unit in the operation screen, outputting notification information representing information on consistency/inconsistency between the application data and the image data.

According to the present invention, the foregoing object is attained by providing a program for implementing control of an image processing apparatus which executes a process for document data in a data management unit that manages, as the document data, at least one of application data created by application software and image data converted into a predetermined format on the basis of the application data, the program comprising:

a program code for a display step of displaying on a display unit an operation screen containing document information on the document data managed in the data management unit and a designation portion for designating editing operation to the document data; and a program code for an output step of, when editing operation to the document data for which the application data and the image data are managed as the document data is designated via the designation unit in the operation screen, outputting notification information representing information on consistency/inconsistency between the application data and the image data.

According to the present invention, the foregoing object is attained by providing an image processing apparatus which executes a process for data managed in a management unit that manages, in correspondence with each other, first data of a predetermined format editable by application software and second data of a format obtained by rasterizing the first data into image data, the apparatus comprising:

a display unit, adapted to display an operation screen containing a designation portion for designating editing operation to the first data or the second data that is managed in the management unit; and an output unit, adapted to, when editing to the first data or the second data is designated via the designation portion in the operation screen, outputting notification information representing information on consistency/inconsistency between the first data and the second data.

In a preferred embodiment, the first data contains data obtained by performing a character recognition process for a character image contained in the second data and converting the character image into a character code, or vector data obtained by performing a vectorization process for a figure image contained in the second data.

In a preferred embodiment, the apparatus further comprises a storage unit adapted to store the management unit.

In a preferred embodiment, the apparatus further comprises an external terminal which is connected via a network and stores the management unit.

In a preferred embodiment, the apparatus further comprises a registration unit adapted to register the first data and the second data in the management unit in correspondence with a specific index.

In a preferred embodiment, the apparatus further comprises an editing unit adapted to, when either of the first data and the second data is edited, editing the other data so as to make the other data consistent with the edited data.

According to the present invention, the foregoing object is attained by providing a method of controlling an image processing apparatus which executes a process for data managed in a management unit that manages, in correspondence with each other, first data of a predetermined format editable by application software and second data of a format obtained by rasterizing the first data into image data, the method comprising:

a display step of displaying an operation screen containing a designation portion for designating editing operation to the first data or the second data that is managed in the management unit; and an output step of, when editing to the first data or the second data is designated via the designation unit in the operation screen, outputting notification information representing information on consistency/inconsistency between the first data and the second data.

According to the present invention, the foregoing object is attained by providing a program for implementing control of an image processing apparatus which executes a process for data managed in a management unit that manages, in correspondence with each other, first data of a predetermined format editable by application software and second data of a format obtained by rasterizing the first data into image data, the program comprising:

a program code for a display step of displaying an operation screen containing a designation portion for designating editing operation to the first data or the second data that is managed in the management unit; and a program code for an output step of, when editing to the first data or the second data is designated via the designation unit in the operation screen, outputting notification information representing information on consistency/inconsistency between the first data and the second data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
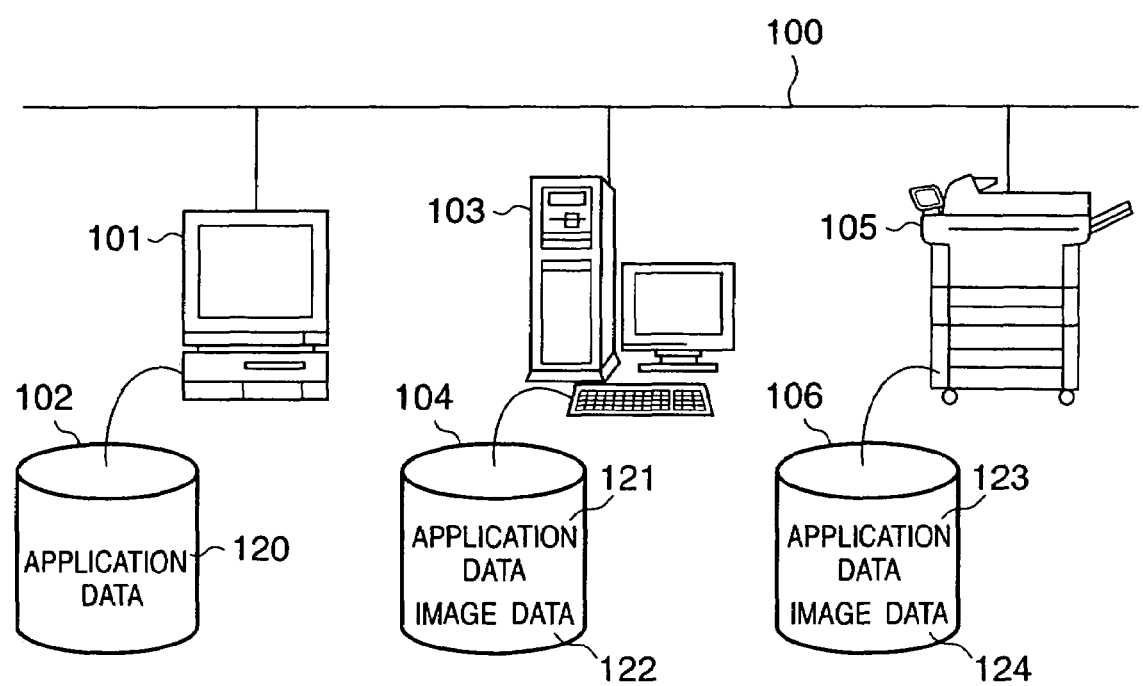
FIG. 1 is a view showing the configuration of a document management system according to the first embodiment of the present invention.

FIG. 1 is a view showing the configuration of a document management system according to the first embodiment of the present invention.

A PC (Personal Computer) 101 runs an application program such as a wordprocessor, spreadsheet software, electronic mail software. The PC 101 is connected to a large-capacity storage device 102.

The large-capacity storage device 102 stores application programs, application data 120 created by an application, an operating system for activating a computer, a printer driver for creating printer data, a program for implementing a flowchart (to be described later), and the like.

The PC 101 is connected to a network 100, and can print, by a printer (not shown) or a multifunction machine 105 on a network, data created by the operating system, application, and printer driver.

The multifunction machine 105 is a multifunction copying machine having COPY, FAX, and network printer functions, and is connected to the network 100. In addition to the COPY, FAX, and network printer functions, the multifunction machine 105 has a SEND function (this function will be defined as iSEND hereinafter) of sending image data read by a scanner to a terminal (e.g., the PC 101) on the network 100, and an Internet FAX function (this function will be defined as IFAX hereinafter) of transmitting/receiving image data via the network 100.

The multifunction machine 105 also has a COPY function (this function will be defined as iCOPY hereinafter) of reading an original with identification information by procedures similar to general copying procedures, acquiring original information (image data) of the original which is specified by the identification information and stored in advance, and printing the original information (image data) as a copy of the read original.

The iSEND function can also transmit (by FAX, E-mail, FTP, or the like) original information acquired by the same procedures (in some cases, after converting the original information into another format).

When the PC 101 is to print the application data 120 by using the network printer function of the multifunction machine 105, a corresponding application is activated in the PC 101. The application program invokes a printer driver which is installed in the PC 101 and corresponds to the multifunction machine 105. The application program creates PDL (Page Description Language) data, and transmits the PDL data to the multifunction machine 105.

Upon receiving the PDL data, the multifunction machine 105 rasterizes an image from the PDL data, and prints the created image by the network printer function.

A document management server 103 is connected to the network 100, and manages application data 121 stored in a large-capacity storage device 104 and image data 122 created from the application data 121 in association with each other.

The image data 122 is data in an image format of each page from the application data. The image data 122 may be TIFF (Tag Image File Format) data, PDF (Portable Document Format) data, vector data interpretable by the multifunction machine 105, or PDL (Page Description Language) data such as PostScript data.

The multifunction machine 105 also has a document management server function, and a large-capacity storage device 106 stores application data 123 and image data 124.

The network 100 is a so-called communication network which is typically implemented by one or a combination of the Internet, LAN, WAN, telephone line, dedicated digital circuit, ATM, frame relay line, communication satellite channel, cable television line, data broadcasting radio channel, and the like as far as the network enables data exchange.

The PC 101 and document management server 103 have standard building components (e.g., CPU, RAM, ROM, hard disk, external storage, network interface, display, keyboard, and mouse) which are mounted in a general-purpose computer.

The detailed configuration of the multifunction machine 105 will be explained with reference to FIG. 2.

Figure 2:
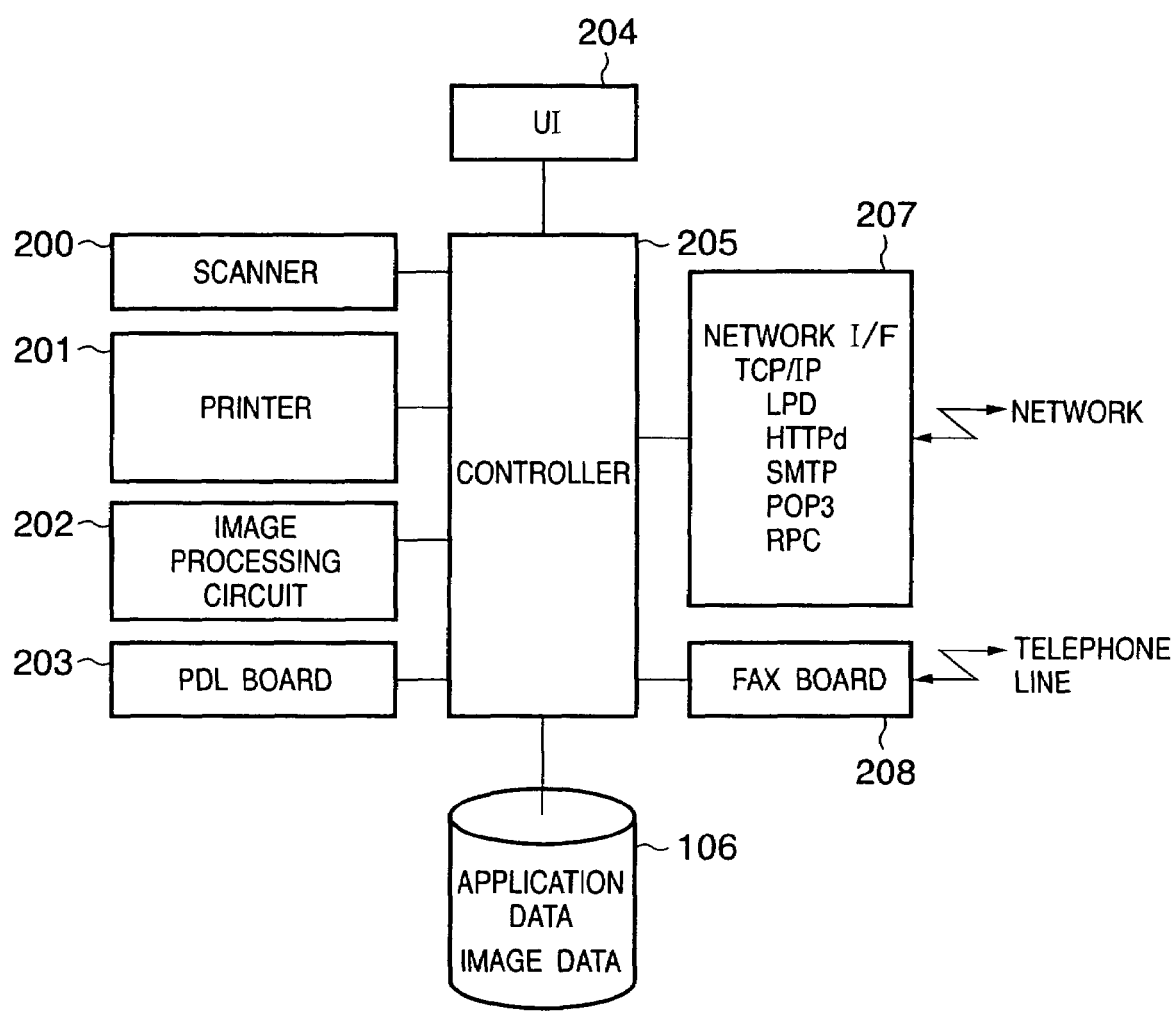
FIG. 2 is a block diagram showing the detailed configuration of a multifunction machine according to the first embodiment of the present invention.

FIG. 2 is a block diagram showing the detailed configuration of the multifunction machine according to the first embodiment of the present invention.

A scanner 200 is equipped with a document feeder. The document feeder sequentially feeds an original page by page from the first page to a platen glass, and discharges the original from the platen glass after the end of original reading operation.

When an original is fed onto the platen glass, the lamp is turned on to start moving a scanner unit. The original is exposed and scanned by movement of the scanner unit. Light reflected by the original in exposure/scanning is guided to a CCD image sensor via a mirror and lens. The image of the scanned original is read by the CCD image sensor. The CCD image sensor photoelectrically converts the optically read image into image data, and outputs the image data.

A printer 201 inputs the image data output from the scanner 200 to a laser driver. The laser driver drives a laser-emitting unit on the basis of the input image data. The laser-emitting unit emits a laser beam corresponding to the input image data. The laser beam scans and irradiates a photosensitive drum, forming an electrostatic latent image corresponding to the laser beam on the photosensitive drum.

The electrostatic latent image on the photosensitive drum is visualized as a developer image with a developer supplied from a developing unit. A printing sheet is fed from a printing sheet cassette at the timing synchronized with the start of irradiation of the laser beam. The printing sheet is conveyed between the photosensitive drum and a transfer unit. The developer image formed on the photosensitive drum is transferred onto the fed printing sheet by the transfer unit.

The printing sheet bearing the developer image is conveyed to a fixing unit, which presses the printing sheet by heat to fix the developer image onto the printing sheet. The printing sheet having passed through the fixing unit is discharged by a discharge roller.

When a sorter is mounted, discharged printing sheets are stored in respective bins and sorted by the sorter.

In this example, the printing method of the printer 201 is electrophotography. However, the printer 201 can utilize another printing method such as inkjet printing or thermal transfer printing.

An image processing circuit 202 performs various image processes such as a trimming process, an image scaling process such as image enlargement/reduction, an image compression process of compressing image data into encoded data such as MH, MR, MMR, JBIG, or JPEG data, and an image decompression process of decompressing encoded data into image data.

A UI (User Interface) 204 is an operation panel which is manipulated by the user in operation and comprised of a liquid crystal display and touch screen. The UI 204 also has hard keys such as a start key, stop key, and ten-key pad.

A PDL board 203 rasterizes PDL data received by a network I/F 207 into image data printable by the printer 201.

A FAX board 208 performs FAX transmission/reception. The FAX board 208 is comprised of an NCU (Network Control Unit) which switches between the telephone and the FAX, detects a ringing signal upon reception, and holds a DC loop signal from a telephone exchange during voice communication, a MODEM (MOdulator/DEModulator) serving as a modulation/demodulation circuit which converts an analog signal into a digital signal and converts a digital signal into an analog signal, an image processing circuit, and the like.

The network I/F 207 is a circuit for connecting the network 100. The program structure which implements this function includes application programs such as a network layer TCP/IP formed from IP (Internet Protocol), TCP (Transmission Control Protocol), and UDP (User Datagram Protocol) of the network layer, a file transfer service FTP (File Transfer Protocol), a printer printing server protocol LPD (Line Printer Daemon), a WWW (World Wide Web) server protocol HTTPd (Hypertext Transfer Protocol daemon), an electronic mail transmission/reception protocol SMTP (Simple Mail Transfer Protocol), a mail download protocol POP3 (Post Office Protocol-Version 3), and RPC (Remote Procedure Call) serving as a function of calling a subroutine present in a remote system via a network.

When the user copies using the multifunction machine 105, he or she sets an image processing method including the number of copies and trimming designation via the UI 204.

When the user presses the start key, a controller 205 receives a copying start instruction and drives the scanner 200.

The controller 205 controls the image processing circuit 202 and printer 201 so as to perform an image process for image data from the scanner 200 by the image processing circuit 202 and execute printing operation by the printer 201 for the image data having undergone the image process.

In FAX transmission, image data read by the scanner 200 is input to the FAX board 208 via the image processing circuit 202.

The FAX board 208 operates circuits such as the MODEM and NCU, and communicates with a transmission destination. The FAX board 208 scales the image in accordance with the receiver performance, encodes the image, and transmits the image data.

In FAX reception, data is received by the NCU, and converted into a digital signal by the MODEM. The controller 205 operates to encode the data again by the image processing circuit 202 and print the data by the printer 201.

When the application data 120 is to be printed from the PC 101, the printer driver installed in the PC 101 creates PDL data and transmits it to the multifunction machine 105 by LPR (Line Printer Request).

The multifunction machine 105 receives the PDL data by the LPD of the network I/F 207, and creates rasterized image data by the PDL board 203. The controller 205 controls to print the rasterized image data by the printer 201, thereby executing printing of the application data.

A client distribution material creation process executed by the PC 101 when application data from the PC 101 is registered in the document management server of the multifunction machine 105 and a distribution material (print material) is printed on the basis of the application data will be explained with reference to FIG. 3.

The distribution material is a print material (original) which is generated by the multifunction machine 105 on the basis of image data received from the PC 101. Since the main purpose of the print material is to distribute it to a plurality of users, the print material will be called a distribution material in the first embodiment. However, the distribution material may be used simply as a copy or permanent data for the user himself, and the purpose is not limited to distribution.

Figure 3:
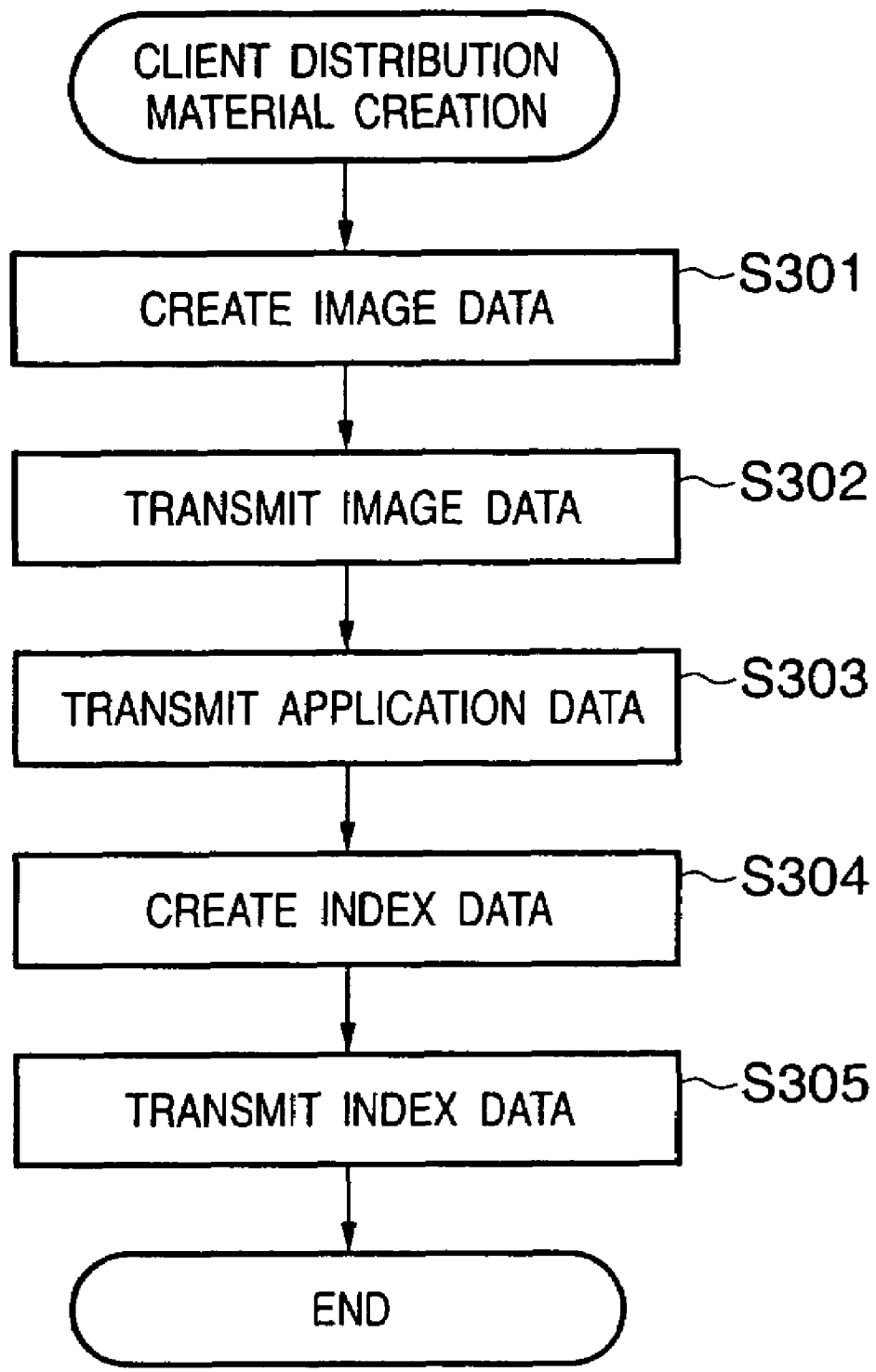
FIG. 3 is a flowchart showing a client distribution material creation process executed by a PC according to the first embodiment of the present invention.

FIG. 3 is a flowchart showing the client distribution material creation process executed by the PC according to the first embodiment.

A client distribution material creation program is activated in the PC 101 in accordance with a user instruction.

In step S301, an image data creation routine is invoked to create, from the application data 120 by using the printer driver, image data of the PDF file format formed by data of pages.

In step S302, the generated image data is transmitted to the multifunction machine 105 via the network 100. In step S303, the application data 120 as generation source data of the image data is transmitted to the multifunction machine 105 via the network 100.

The transmitted image data and application data are stored in the database of the multifunction machine 105. In step S304, index data capable of managing and searching for these data is created. In step S305, the created index data is transmitted to the multifunction machine 105 via the network 100. The process then ends.

Data transmission in steps S302, S303, and S305 is implemented by, e.g., the RPC protocol.

Various processes executed by the multifunction machine 105 according to the first embodiment will be described with reference to FIGS. 4 to 7. In the flowcharts of FIGS. 4 to 7, the same reference numerals denote the same processing steps. These flowcharts are executed under the control of the controller 205 of the multifunction machine 105.

The first distribution material creation process of creating a distribution material by the multifunction machine 105 using image data and application data which are received from the PC 101 will be explained with reference to FIG. 4.

Figure 4:
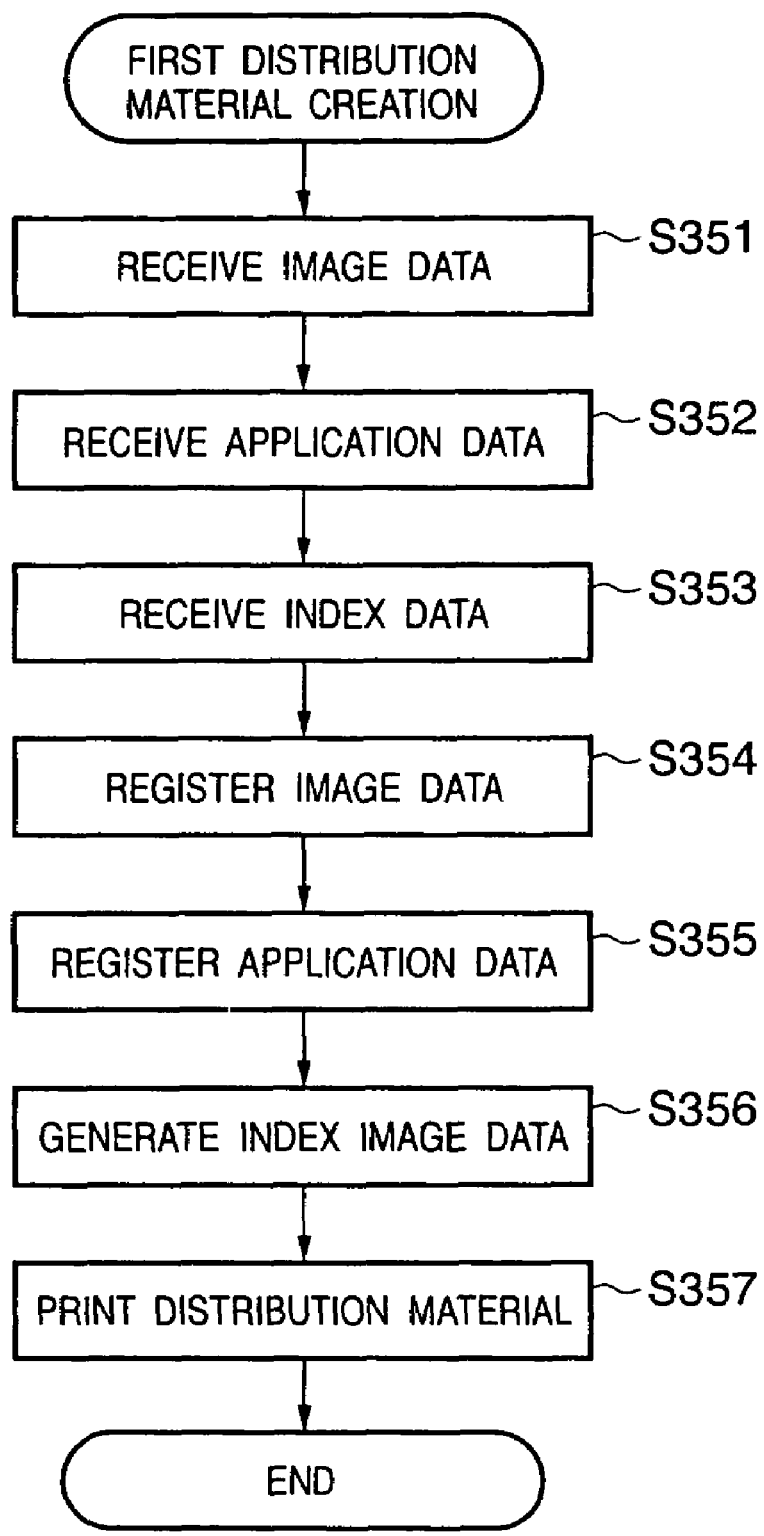
FIG. 4 is a flowchart showing the first distribution material creation process executed by the multifunction machine according to the first embodiment of the present invention.

FIG. 4 is a flowchart showing the first distribution material creation process executed by the multifunction machine according to the first embodiment of the present invention.

In step S351, the multifunction machine 105 receives via the network 100 image data transmitted by the PC 101. In step S352, the multifunction machine 105 receives via the network 100 application data transmitted by the PC 101. In step S353, the multifunction machine 105 receives from the PC 101 via the network 100 index data for managing and searching for the received image data and application data.

The index data is formed from, e.g., address information representing the storage destination of image data, the file format of the image data, the size, the registration date and time, and the registration user name.

In step S354, after the index data is received, the image data is registered as the image data 124 in the database of the large-capacity storage device 106. In step S355, the received application data is registered as the application data 123 in the database. Also, the received index data is registered in the database. The image data and application data corresponding to the index data are associated with each other and can be searched for from the database.

In step S356, the received index data is converted into barcode image data, and the barcode image data is composited with the received image data to generate index image data.

As the barcode data, the first embodiment employs a QR code serving as a two-dimensional barcode which can express many pieces of information and has an error correction function.

The type of barcode data is not limited to the QR code, and may be a one-dimensional code such as JAN, standard ITF, CODE-128, CODE39, or NW-7, or a two-dimensional barcode such as PDF417, DataMatrix, MaxiCode, VeriCode, or CODE49.

A material which is printed on the basis of the index image data is mainly utilized as a distribution material, as described above. For this reason, in step S357, a material based on the index image data is printed as a distribution material, and the process ends.

In this case, a necessary number of copies can be set through the UI 204 to print the distribution material by the set number of copies by the multifunction machine 105. The distribution material is printed by the number of copies necessary for a meeting or the like, distributed, and used.

The second distribution material creation process of creating a distribution material by the multifunction machine 105 by reading a paper original by the scanner 200 will be explained with reference to FIG. 5.

Figure 5:
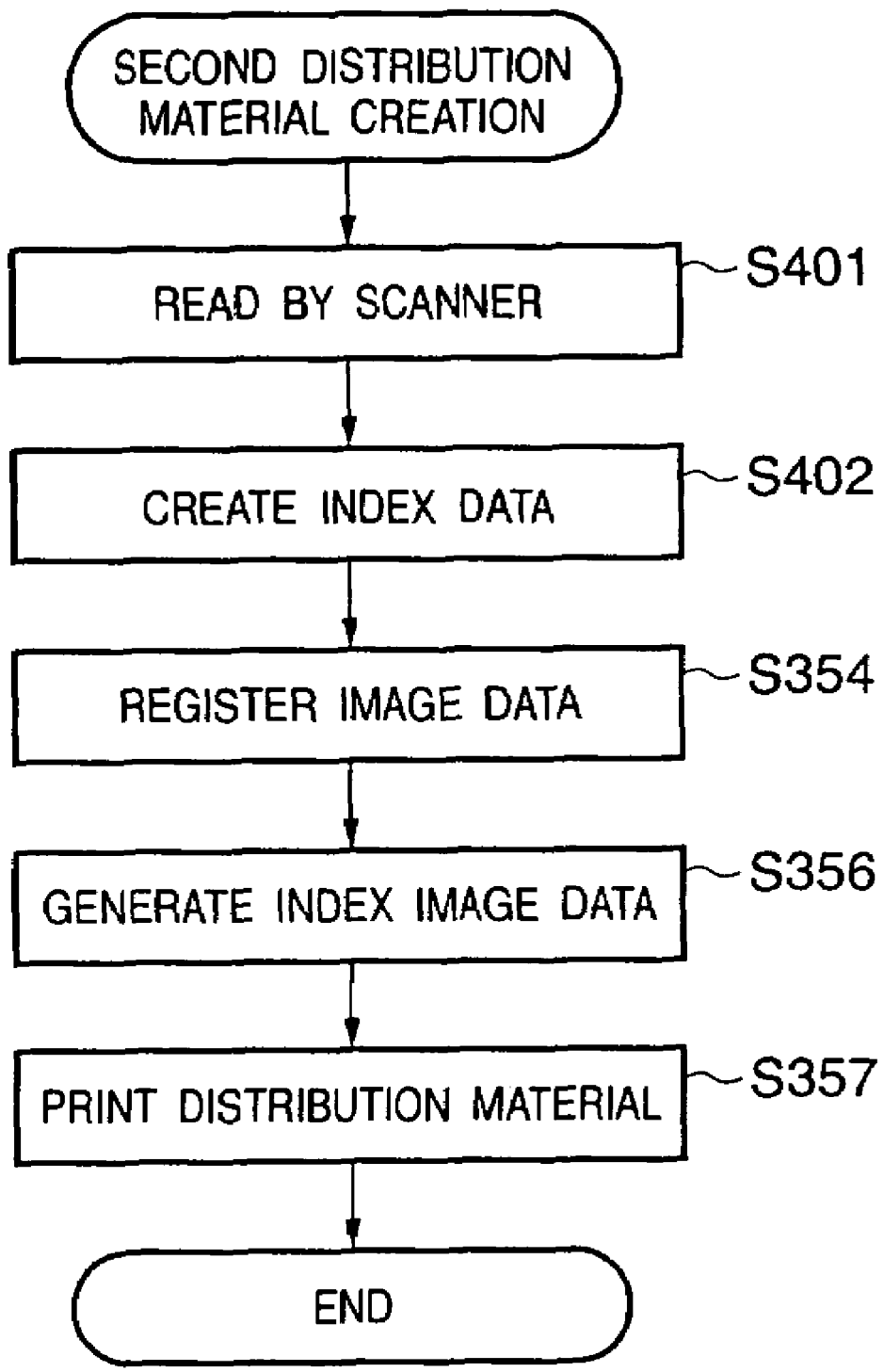
FIG. 5 is a flowchart showing the second distribution material creation process executed by the multifunction machine according to the first embodiment of the present invention.

FIG. 5 is a flowchart showing the second distribution material creation process executed by the multifunction machine according to the first embodiment of the present invention.

In step S401, an original is set on the document feeder of the scanner 200 to generate image data of the original.

In step S402, index data capable of searching the database for the image data when the image data is registered in the database is created. In step S354, the image data is registered as the image data 124 in the large-capacity storage device 106.

In step S356, the created index data is converted into barcode image data, and the barcode image data is composited with the image data read by the scanner 200 to generate index image data. In step S357, a material based on the index image data is printed as a distribution material, and the process ends.

The third distribution material creation process of creating a distribution material by the multifunction machine 105 from FAX data received by the FAX board 208 will be explained with reference to FIG. 6.

Figure 6:
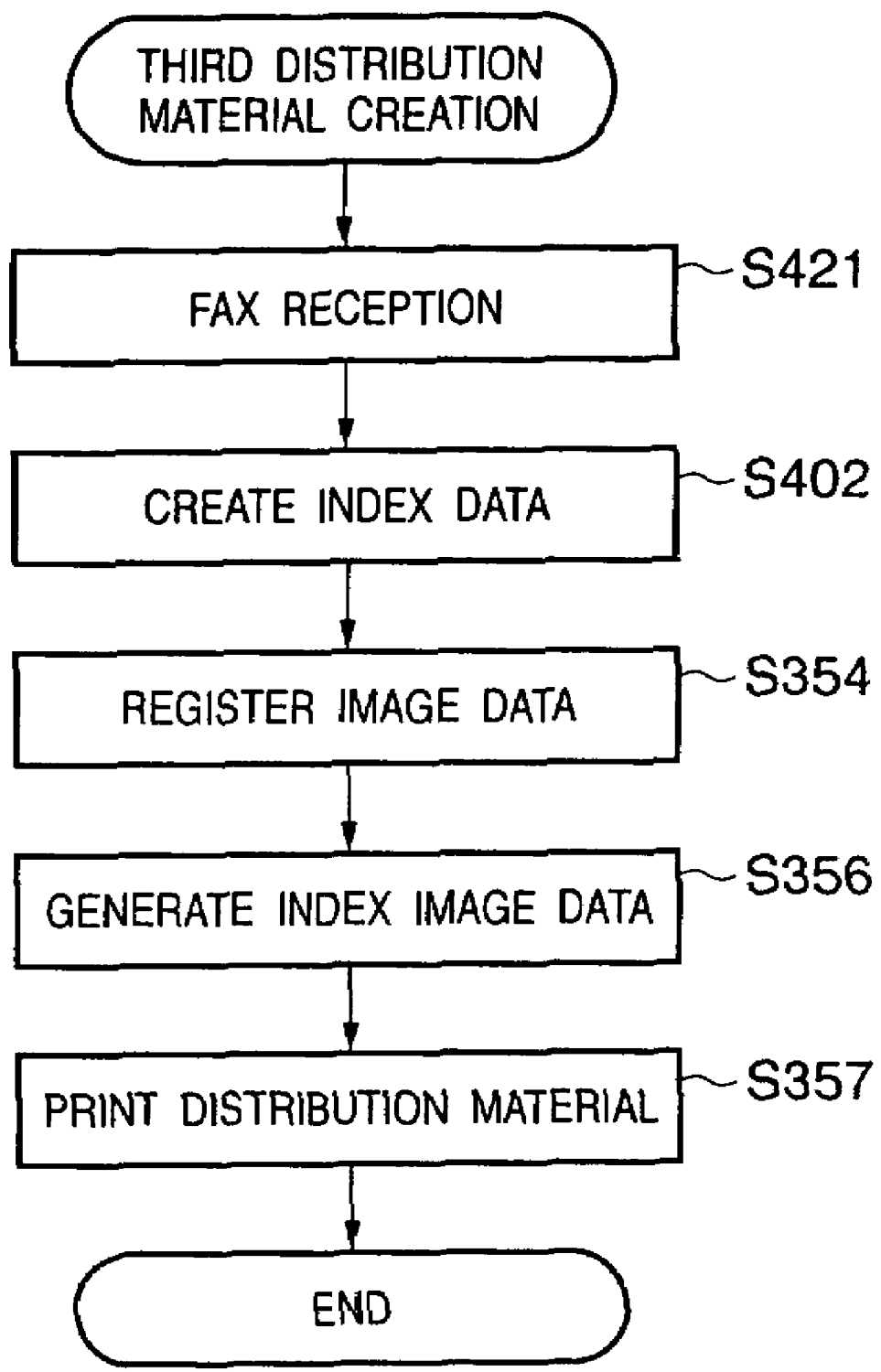
FIG. 6 is a flowchart showing the third distribution material creation process executed by the multifunction machine according to the first embodiment of the present invention.

FIG. 6 is a flowchart showing the third distribution material creation process executed by the multifunction machine according to the first embodiment of the present invention.

In step S421, when a FAX ringing signal is detected, the FAX board 208 receives FAX data, and converts the received FAX data into image data.

In step S402, index data capable of searching the database for the image data when the image data is registered in the database is created. In step S354, the image data is registered as the image data 124 in the large-capacity storage device 106.

In step S356, the created index data is converted into barcode image data, and the barcode image data is composited with the FAX-received image data to generate index image data. In step S357, a material based on the index image data is printed as a distribution material, and the process ends.

The fourth distribution material creation process of creating a distribution material by the multifunction machine 105 from data received by the IFAX (Internet FAX) will be explained with reference to FIG. 7.

Figure 7:
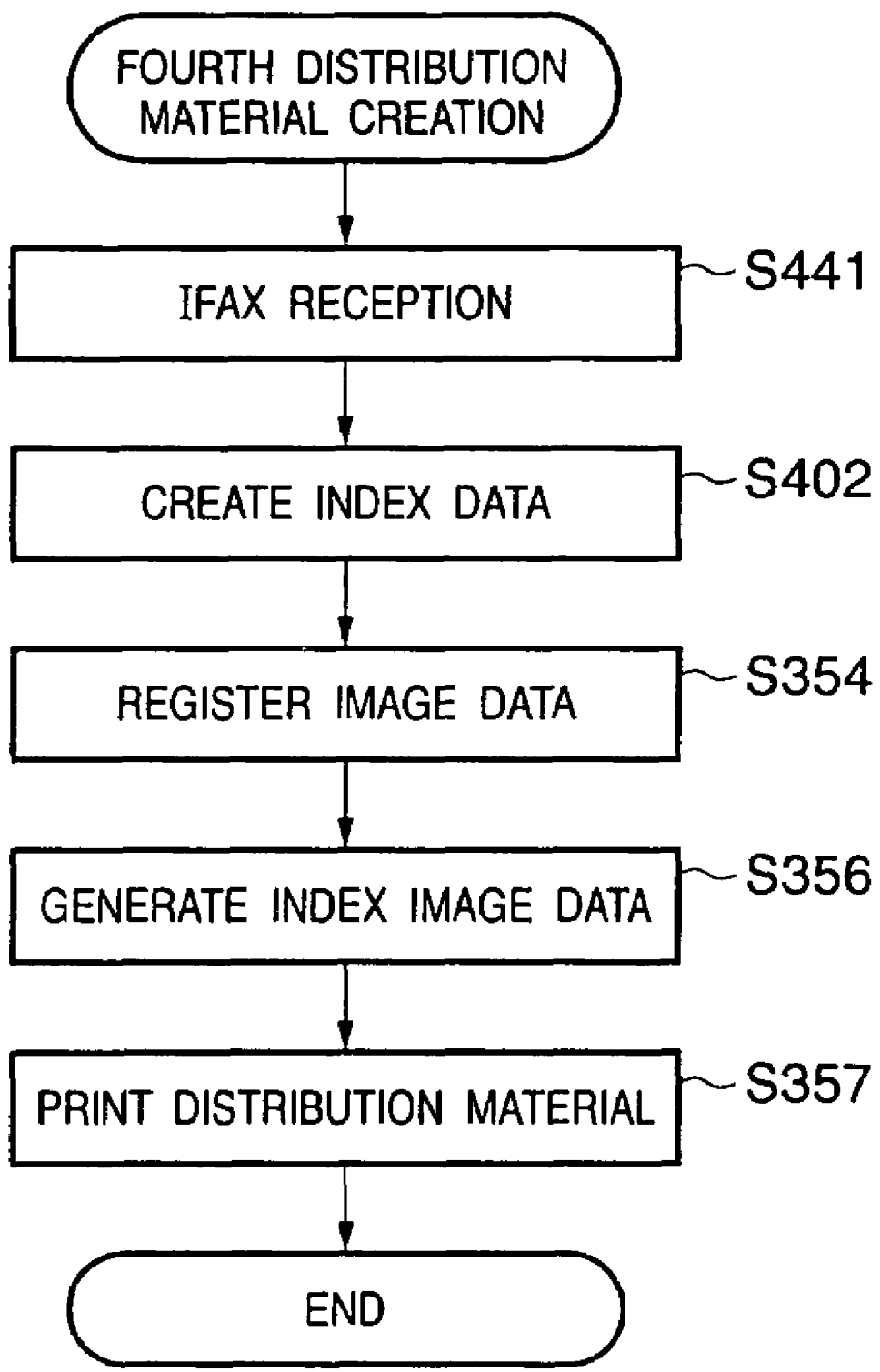
FIG. 7 is a flowchart showing the fourth distribution material creation process executed by the multifunction machine according to the first embodiment of the present invention.

FIG. 7 is a flowchart showing the fourth distribution material creation process executed by the multifunction machine according to the first embodiment of the present invention.

In step S441, when the Internet FAX receives electronic mail with, e.g., a TIFF file by POP3 or SMTP, the TIFF file of the received data is extracted to generate image data.

In step S402, index data capable of searching the database for the image data when the image data is registered in the database is created. In step S354, the image data is registered as the image data 124 in the large-capacity storage device 106.

In step S356, the created index data is converted into barcode image data, and the barcode image data is composited with the IFAX-received image data to generate index image data. In step S357, a material based on the index image data is printed as a distribution material, and the process ends.

An example of the distribution material created by the processes in FIGS. 4 to 7 will be explained with reference to FIG. 8.

Figure 8:
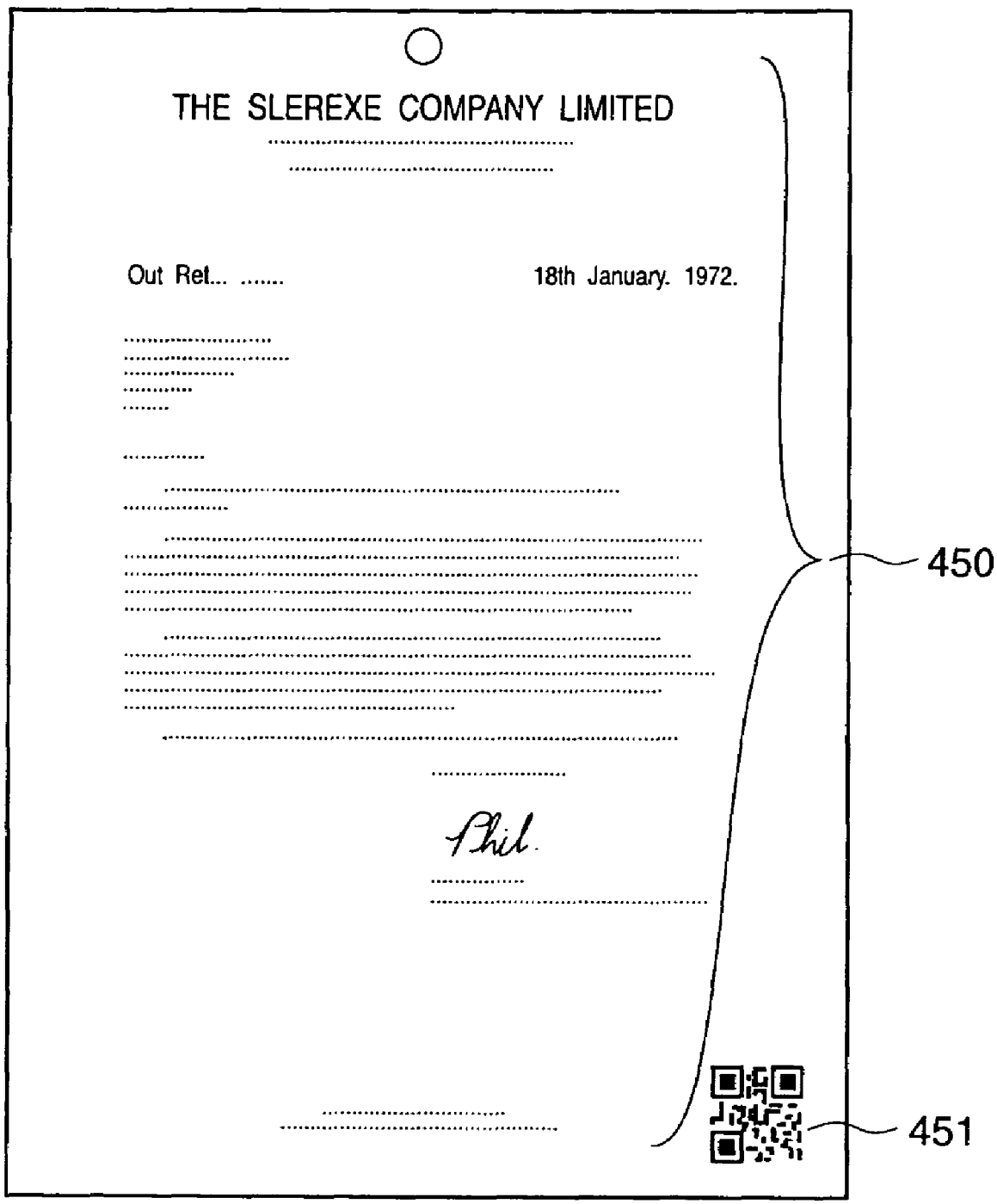
FIG. 8 is a view showing an example of a distribution material according to the first embodiment of the present invention.

FIG. 8 is a view showing an example of the distribution material according to the first embodiment of the present invention.

In the distribution material of FIG. 8, reference numeral 450 denotes an image which is an image created by the application of the PC 101, an image read by the scanner 200, a FAX-received image, or an IFAX-received image. The image is registered as the image data 124 in the database and can be searched for by using index data.

Reference numeral 451 denotes index data which is printed at the lower right corner of the image 450 after the index data is converted into image data as a QR code serving as a two-dimensional barcode.

In this case, the multifunction machine 105 is regarded as a printing apparatus. As the feature of the printing apparatus, the multifunction machine 105 receives image data, and registers it in the database in correspondence with a specific index. The multifunction machine 105 composites the image data and corresponding index data to generate index image data having index information. The multifunction machine 105 can print the index image data as a distribution material.

The multifunction machine 105 reads as an original the distribution material generated from the index image data, and extracts the index data from the read image. At least one of the image data and application data which are stored in the database and specified by the extracted index data can be acquired.

The multifunction machine 105 can print or transfer the image data or application data as data corresponding to the read original in accordance with the intended use or application purpose.

iCOPY operation of searching for an original image (image data) registered in the database of the multifunction machine 105 on the basis of the distribution material and printing the original image will be described with reference to FIG. 9.

The original image is an image which is created by the application of the PC 101 and registered in the multifunction machine 105, an image read by the scanner 200, a FAX-received image, or an IFAX-received image by any one of the processes of FIGS. 4 to 7.

Figure 9:
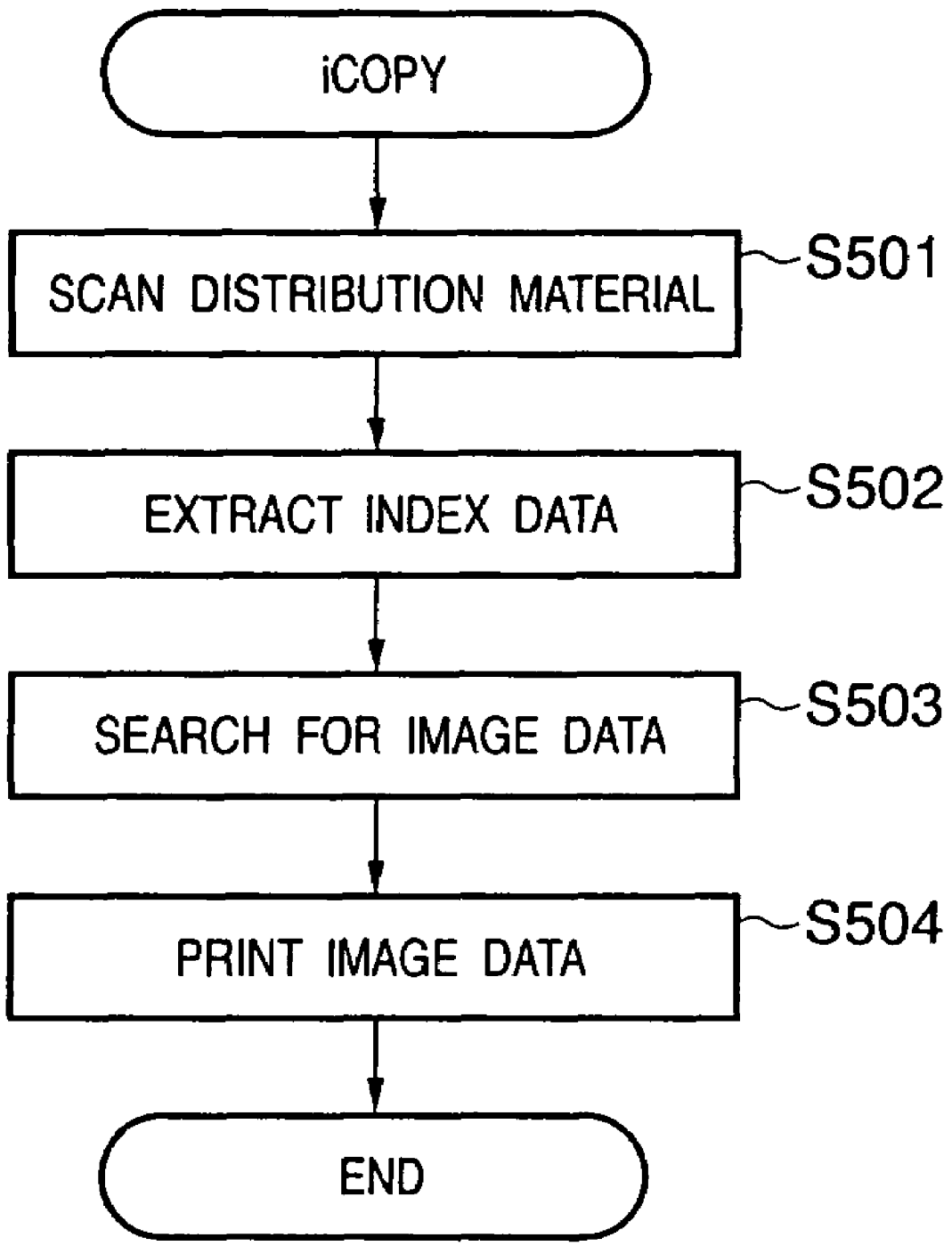
FIG. 9 is a flowchart showing iCOPY operation according to the first embodiment of the present invention.

FIG. 9 is a flowchart showing iCOPY operation according to the first embodiment of the present invention.

The distribution material is not limited to one printed in S357, but may be a distribution material whose image quality is low because the distribution material printed in S357 is repetitively copied, a distribution material which has a memo written by another person, a distribution material punched for binding by a binder or the like, or a distribution material obtained by copying a color distribution material by a monochrome copying machine. Note that index data shown in FIG. 8 must be printed in the distribution material.

In step S501, execution of iCOPY operation is designated through the UI 204. A distribution material is scanned as an original to be scanned by the scanner 200 to load the image of the distribution material (original) and generate image data.

In step S502, the loaded image data is analyzed to search for a QR code serving as a two-dimensional barcode in the image data. The QR code found upon search is analyzed to extract index data.

In step S503, the image data 124 which corresponds to the scanned distribution material and is stored in the large-capacity storage device 106 is searched for on the basis of the extracted index data. In step S504, the acquired image data is printed, and the process ends.

Unlike a distribution material whose image greatly degrades, the printed image is an image created by the application of the PC 101, an image which is read by the scanner 200 and registered, or a clear image received by the FAX or IFAX.

iSEND operation of searching for an original image registered in the database of the multifunction machine 105 on the basis of the distribution material and sending the original image will be described with reference to FIG. 10.

Figure 10:
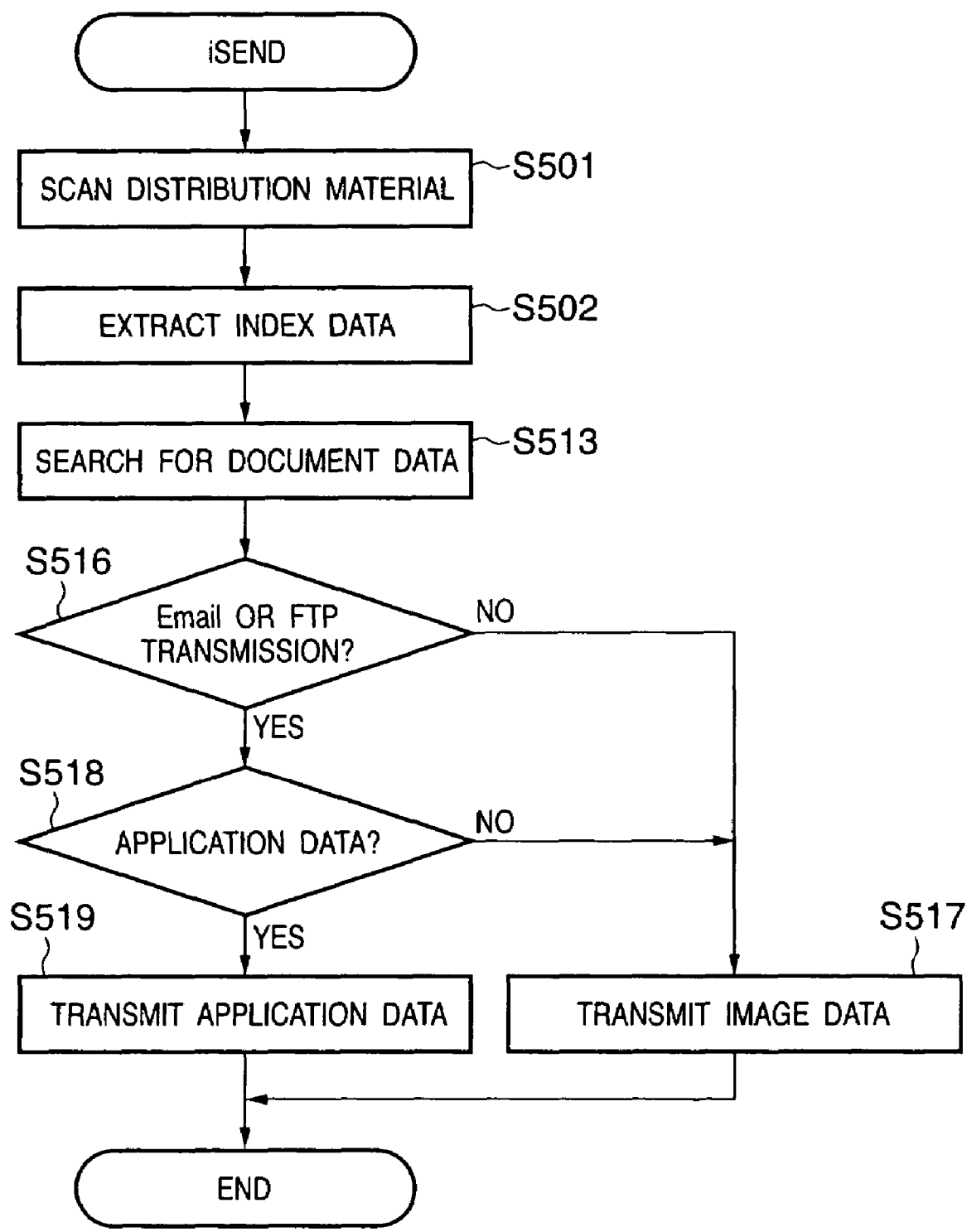
FIG. 10 is a flowchart showing iSEND operation according to the first embodiment of the present invention.

FIG. 10 is a flowchart showing iSEND operation according to the first embodiment of the present invention.

iSEND operations can be classified into FAX transmission and IFAX transmission capable of transmitting only an image, and Email transmission and FTP transmission capable of transmitting not only an image but also any data. Transmission operations are classified by the transfer protocol and component, and can be selected by the user in transmission. As described above, the distribution material may be one whose image greatly degrades. Note that index data shown in FIG. 8 must be printed in the distribution material.

In step S501, execution of iSEND operation is designated through the UI 204. A distribution material is scanned as an original to be scanned by the scanner 200 to load the image of the distribution material (original) and generate image data.

In step S502, the loaded image data is analyzed to search for a QR code serving as a two-dimensional barcode in the image data. The found QR code is analyzed to extract index data.

In step S513, document data (application data and image data) which corresponds to the scanned distribution material and is stored in the large-capacity storage device 106 is searched for on the basis of the extracted index data.

In the first embodiment, particularly when application data generated by the PC 101 is registered in the database of the large-capacity storage device 106, image data corresponding to the application data is also registered. In the PC 101, the application data can be referred to as a document in the application program which has created the application data. The image data can be referred to as a document by printing the image data. From this, the first embodiment processes, as document data, application data registerable in the database and corresponding image data, only application data, or only image data.

That is, document data registered in the database in the description of the first embodiment may be application data and corresponding image data, only application data, or only image data.

In step S516, whether the type of transmission method is Email transmission or FTP transmission is determined. If the type of transmission method is neither Email transmission nor FTP transmission (NO in step S516), the process advances to step S517. If the type of transmission method is Email transmission or FTP transmission (YES in step S516), i.e., Email or FTP capable of transmitting not only an image but also any data is selected in transmission selection, whether application data corresponding to the scanned distribution material exists is determined in step S518.

If no application data exists (NO in step S518), the process advances to step S517. If application data exists (YES in step S518), the process advances to step S519 to transmit the application data.

In the process of FIG. 10, if the type of transmission method is one other than Email or FTP or even if Email transmission or FTP transmission is selected but no application data exists, the original image data corresponding to the scanned distribution material is transmitted, and the process ends.

When application data exists, data transmitted by Email or FTP is application data capable of reusing data. The transmission data size decreases, and the transmission rate increases.

Also in image data transmission, the transmission image is not image data whose image degrades, like a distribution material. A high-quality scanned or received original image (original image data) can be transmitted.

An example of a user operation window on the UI 204 when document data (application data and original image data) corresponding to a distribution material is processed by iCOPY operation or iSEND operation will be described with reference to FIG. 11.

Figure 11:
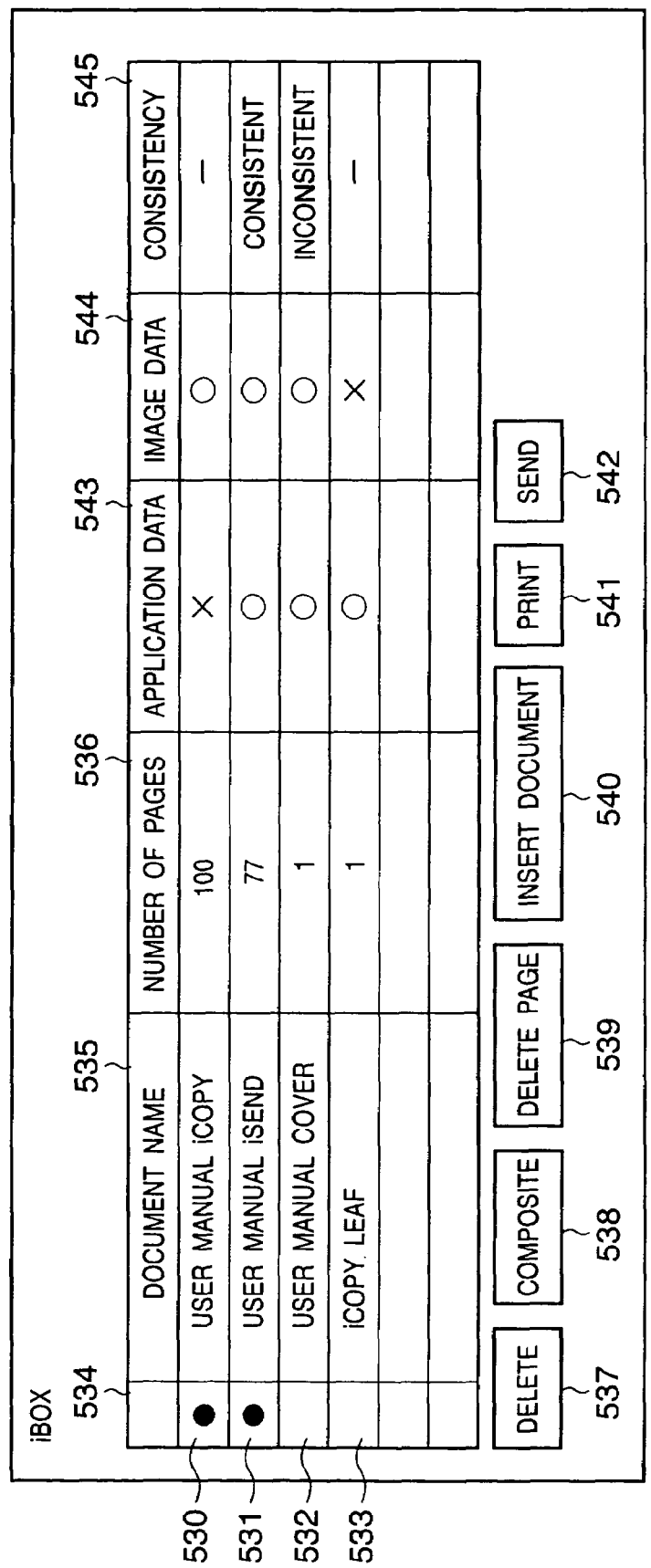
FIG. 11 is a view showing an example of a user operation window on a UI according to the first embodiment of the present invention.

FIG. 11 is a view showing an example of the user operation window on the UI according to the first embodiment of the present invention.

FIG. 11 illustrates an iBOX user operation window which displays a list of document information (e.g., document name, the number of pages, and management state information (presence/absence of application data, presence/absence of image data, and the consistency/inconsistency between application data and image data)) on the application data 123 and image data 124 which are stored in the large-capacity storage device 106.

The controller 205 of the multifunction machine 105 refers to index data in the database of the large-capacity storage device 106, and generates the user operation window on the basis of the referred contents. Alternatively, a data table for generating the user operation window may be stored in the large-capacity storage device 106.

Document information displayed in the user operation window of FIG. 11 is merely an example. The display contents can be appropriately selected in accordance with the intended use or application purpose as far as the document information is information on document data such as an owner user, data size, and registration date.

In the user operation window of FIG. 11, pieces of document data stored in the database of the large-capacity storage device 106 are displayed as a list in record rows 530 to 533. In particular, a document to be processed can be selected on the basis of the user operation window by, e.g., operating (clicking) a corresponding document name.

Reference numeral 535 denotes a document name column which displays the document name of a document stored in the database. The record row 530 represents a document name "user manual iCOPY", the record row 531 represents a document name "user manual iSEND", the record row 532 represents a document name "user manual cover", and the record row 533 represents a document name "iCOPY leaf".

Reference numeral 534 denotes a mark display column representing selection/non-selection of a document to be processed. For example, when a document name in a desired record row is selected, a selection mark "●" representing a message to this effect is displayed in the mark display column 534. The selection/non-selection state changes in a toggle manner in accordance with document name selection operation. In the non-selection state, the selection mark "●" disappears.

Reference numeral 536 denotes a page number column representing the number of pages of a document.

Reference numeral 543 denotes an application data display column representing the presence/absence of application data as document data corresponding to a document name. The application data display column 543 displays "○" when application data exists, and "x" when no application data exists.

Reference numeral 544 denotes an image data display column representing the presence/absence of image data as document data corresponding to a document name. The image data display column 544 displays "○" when image data exists, and "x" when no image data exists.

Reference numeral 545 denotes a consistency display column which displays information representing consistency when application data and image data exist as document data. The consistency display column 545 displays "consistent" when application data and image data are consistent with each other, and "inconsistent" when application data is inconsistent with image data. Further, when only one of application data and image data exists, the consistency display column 545 displays "-" as information to this effect.

Reference numerals 537 to 540 denote various document editing keys for editing image data corresponding to a document name. These keys will be explained.

The key 537 is a "delete" key for deleting application data corresponding to a selected document name.

The key 538 is a "composite" key for, when a plurality of document names are selected, compositing image data corresponding to the document names into one image data.

The key 539 is a "delete page" key for deleting page image data from image data corresponding to a selected document name.

Page image data to be deleted can be selected by, e.g., presenting the thumbnail images of page image data in image data on the UI 204 and accepting selection of page image data to be deleted from the user.

The key 540 is an "insert document" key for inserting image data or page image data corresponding to another document name before or after page image data in image data corresponding to a selected document name, and composing the data into one image data.

The insertion position can be designated by, e.g., presenting the thumbnail images of page image data in image data on the UI 204 and accepting selection of page image data before or after the insertion position from the user. Image data or page image data to be inserted can be selected by, e.g., presenting the thumbnail images of image data or page image data to be inserted on the UI 204 and accepting selection of page image data to be inserted from the user.

Reference numeral 541 denotes a "print" key for printing image data corresponding to a selected document name.

Reference numeral 542 denotes a "send" key for, when application data corresponding to a selected document name exists, sending the application data, and when no application data exists but only image data exists, sending the image data.

When, for example, the "composite" key 538 is operated in the user operation window of FIG. 11, target image data are composited into one image data, but corresponding application data are not composited. As a result, the composited image data does not have any corresponding application data, whereas application data corresponding to the image data before composition does not have any corresponding image data. The contents of image data after composition and those of application data corresponding to image data before composition become inconsistent with each other.

In general, it is highly likely that such inconsistent application data will become unnecessary. Thus, when the "composite" key 538 is operated, a user operation window (FIG. 12) for deleting application data is displayed on the UI 204.

Similarly, when the "delete" key 537, "delete page" key 539, or "insert document" key 540 is operated, application data may become inconsistent. Thus, the user operation window (FIG. 12) for deleting application data is displayed on the UI 204.

A user operation window displayed when one of document editing keys such as the "delete" key 537, "composite" key 538, "delete page" key 539, and "insert document" key 540 is operated in the user operation window of FIG. 11 will be explained with reference to FIG. 12.

Figure 12:
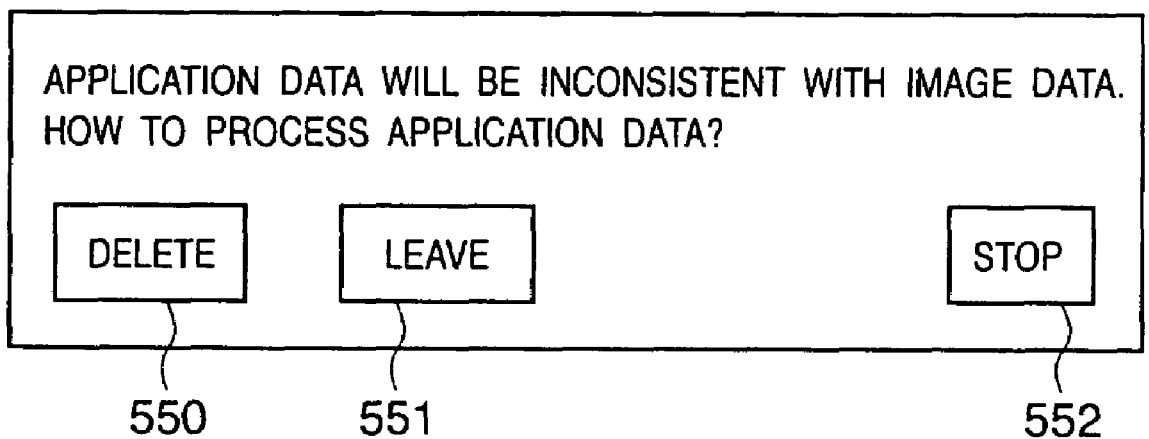
FIG. 12 is a view showing another example of the user operation window on the UI according to the first embodiment of the present invention.

FIG. 12 is a view showing another example of the user operation window on the UI according to the first embodiment of the present invention.

As described above, for example, when the "composite" key 538 is operated, image data can be composited, but no application data can be composited. The image data and application data become inconsistent with each other, and the application data remains as useless (unnecessary) data in the large-capacity storage device 106.

The first embodiment provides the user operation window in FIG. 12 as an operation window for notifying the user that image data and application data become inconsistent with each other owing to a document editing key, and performing operation to application data. The user operation window in FIG. 12 provides a "delete" key 550 as a key for deleting unnecessary application data.

When the "delete" key 550 is operated, application data corresponding to a document name to be processed is deleted. For example, when image data having document names "user manual iCOPY" and "user manual iSEND" are composited and the "delete" key 550 is operated, their corresponding application data are deleted. However, no application data corresponding to the document name "user manual iCOPY" exists originally. In this case, only application data corresponding to the document name "user manual iSEND" is deleted.

However, even if inconsistent application data exists upon operation of a document editing key, the application data may be necessary in accordance with the intended use or application purpose.

For this reason, the user operation window in FIG. 12 provides a "leave" key 551 as a key for intentionally leaving inconsistent application data.

When the "leave" key 551 is operated, application data corresponding to a document name to be processed is managed in the database without being deleted even after document editing of corresponding image data. At this time, the application data may be saved with another name and managed in correspondence with image data before processing that corresponds to the application data.

In the user operation window, reference numeral 552 denotes a "stop" key for stopping document editing operation by a selected document editing key.

By displaying the user operation window in FIG. 12, as described above, inconsistent application data can be deleted or managed without being deleted in accordance with the intended use or application purpose in document editing operation when application data and image data coexist. The user can be given a wider variety of the contents of operation to application data, thereby improving operability.

A document editing process by one of document editing keys such as the "delete" key 537, "composite" key 538, "delete page" key 539, and "insert document" key 540 will be explained with reference to FIG. 13.

Figure 13:
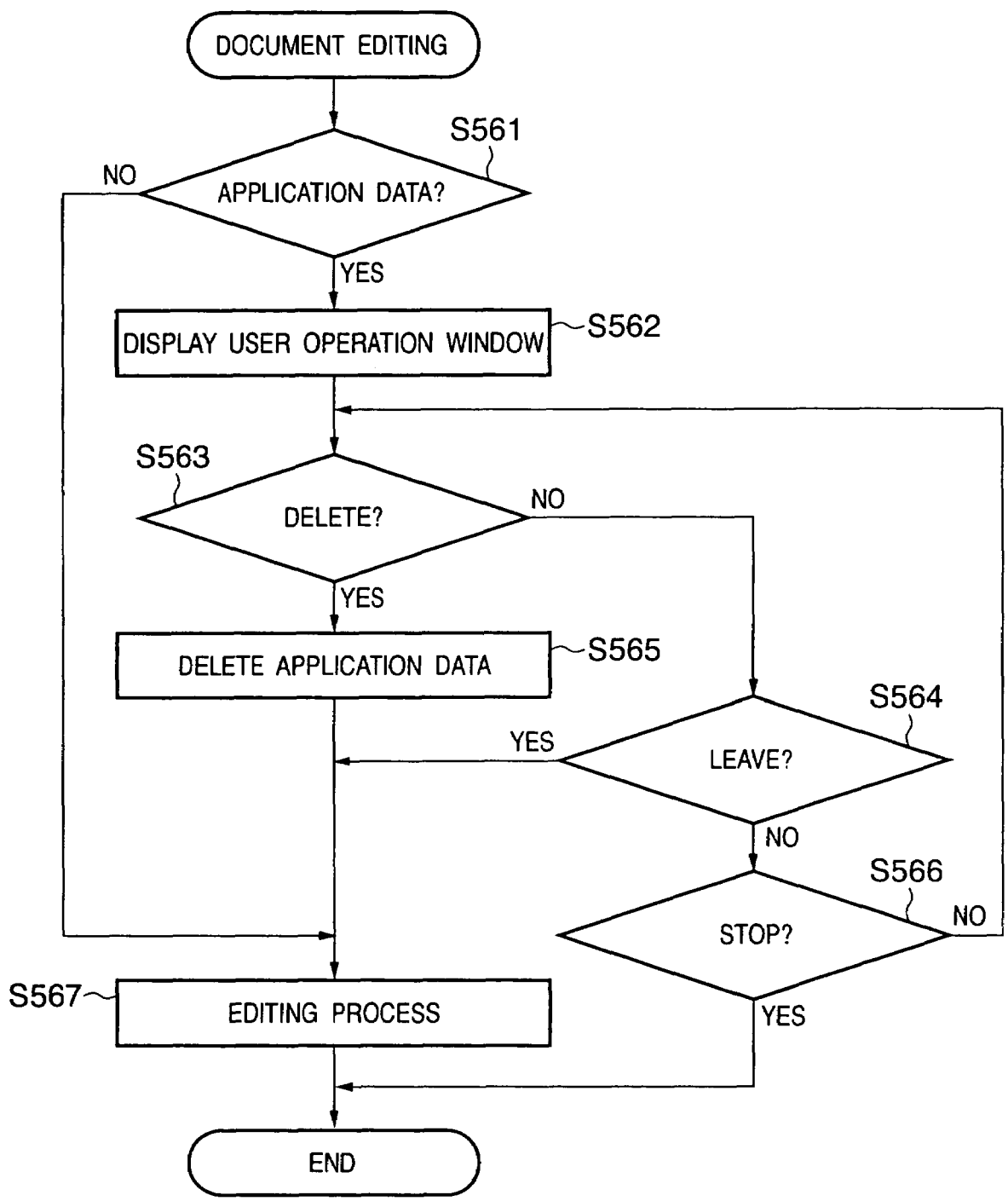
FIG. 13 is a flowchart showing a document editing process according to the first embodiment of the present invention.

FIG. 13 is a flowchart showing the document editing process according to the first embodiment of the present invention.

This process is executed by operating one of document editing keys such as the "delete" key 537, "composite" key 538, "delete page" key 539, and "insert document" key 540.

In step S561, whether application data corresponding to a selected document name to be processed exists is determined. If no application data exists (NO in step S561), the process advances to step S567. If application data exists (YES in step S561), the process advances to step S562 to display the user operation window of FIG. 12 (step S562).

In step S563, whether the "delete" key 550 in the user operation window of FIG. 12 has been operated is determined. If the "delete" key 550 has been operated (YES in step S563), the process advances to step S565 to delete the application data. If the "delete" key 550 has not been operated (NO in step S563), the process advances to step S564.

In step S564, whether the "leave" key 551 in the user operation window of FIG. 12 has been operated is determined. If the "leave" key 551 has not been operated (NO in step S564), the process advances to step S566. If the "leave" key 551 has been operated (YES in step S564), the process advances to step S567.

In step S566, whether the "stop" key 552 in the user operation window of FIG. 12 has been operated is determined. If the "stop" key 552 has not been operated (NO in step S566), the process returns to step S563. If the "stop" key 552 has been operated (YES in step S566), the process ends.

In step S567, a process corresponding to a document editing key selected from the "delete" key 537, "composite" key 538, "delete page" key 539, and "insert document" key 540 is executed, and the process ends.

If application data is deleted by the document editing process of the document editing key, or application data is saved without being deleted and the consistent state changes, the changed contents are properly updated. For example, the contents are updated from "consistent" to "inconsistent" or from application data "○" to "x".

As described above, according to the first embodiment, the presence/absence of application data and image data is explicitly represented in a document management system which manages, in correspondence with each other, application data and image data obtained by rasterizing the application data into an image. When image data and corresponding application data become inconsistent with each other upon editing operation to the image data, the user is notified of a message to this effect, and given an operation chance to process the application data.

Accordingly, the user can be notified of the management state (presence/absence of application data, presence/absence of image data, and the consistency/inconsistency between application data and image data) of image data and application data, and given an operation chance corresponding to the consistent state. The operability in the document management system can further be improved.

Second Embodiment

The second embodiment will exemplify an application of the first embodiment.

In the second embodiment, in order to further increase the efficiency of document editing operation, display/operation control to various document editing keys of the user operation window in FIG. 11 according to the first embodiment is executed in accordance with the states of application data and image data corresponding to a document name to be processed.

Figure 14:
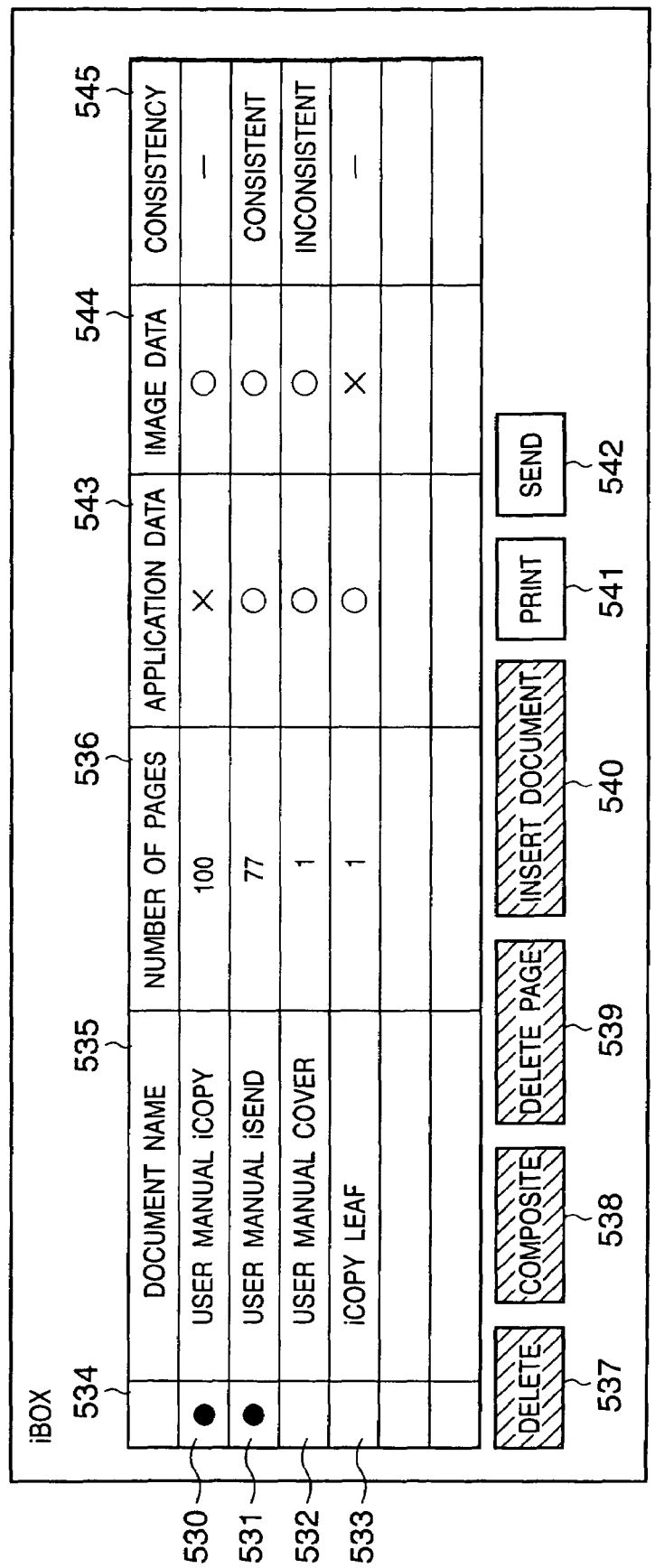
FIG. 14 is a view showing an example of a user operation window on a UI according to the second embodiment.

FIG. 14 is a view showing an example of the user operation window on the UI according to the second embodiment.

In the user operation window of FIG. 14, operation to various document editing keys is inhibited in accordance with the presence/absence of application data corresponding to a document name to be processed, unlike the user operation window of FIG. 11 in the first embodiment.

In the example of FIG. 14, a document name "user manual iSEND" is currently selected, and both application data and image data exist as data corresponding to this document name. If document editing operation to image data is permitted in this state, the consistency between application data and image data may change from "consistent" to "inconsistent" depending on the operation contents.

In order to prevent the possibility of changing the consistency between application data and image data from "consistent" to "inconsistent" depending on document editing operation, the second embodiment executes control to inhibit operation to a document editing key when application data exists as data corresponding to a document name to be processed.

This will be explained in detail for the above-described example. When the document name "user manual iSEND" is selected as a processing target, application data exists as corresponding data. In this case, in order to inhibit operation to various document editing keys such as a "delete" key 537, "composite" key 538, "delete page" key 539, and "insert document" key 540, the display form of the document editing keys is changed from that in FIG. 11 (normal display: a state in which operation to document editing keys is permitted) to a hatched display, notifying the user that the operation is inhibited. Even if a document editing key is operated in this state, the operation is ignored.

The display form of the display is not limited to the hatched display, and can take any form as far as operation to various document editing keys can be inhibited and preferably the user can easily visually recognize the current state. For example, a blinking display, flickering display, or color component display may be employed instead of the hatched display. Display of various document editing keys may be inhibited.

In the example of FIG. 14, inhibition of operation to various document editing keys is executed for all document editing keys. Alternatively, operation to some document editing keys may be inhibited in accordance with the intended use or application purpose.

A document selection process when a document is selected in the user operation window of FIG. 14 will be explained with reference to FIG. 15.

Figure 15:
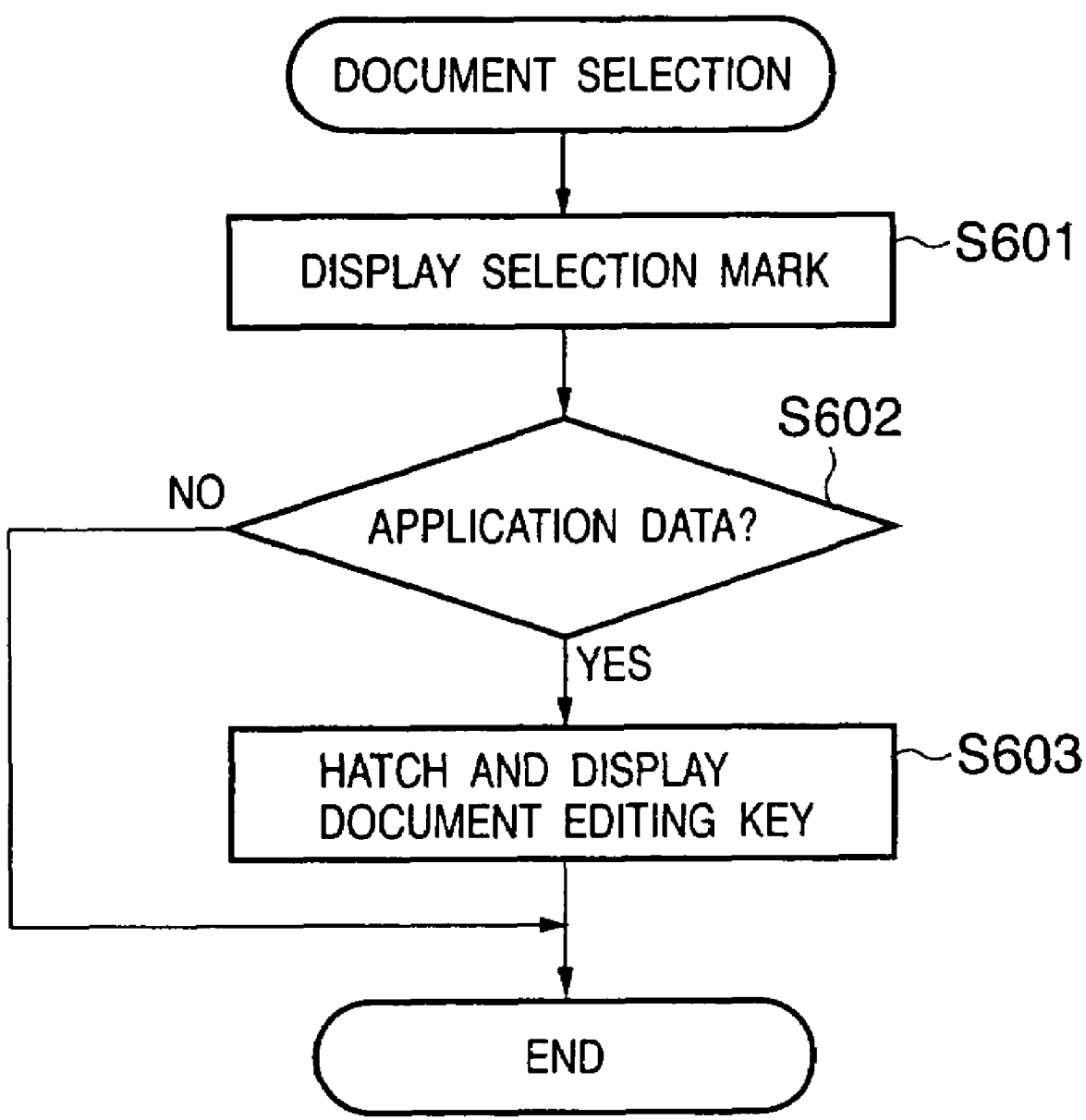
FIG. 15 is a flowchart showing a document selection process executed by a multifunction machine according to the second embodiment of the present invention.

FIG. 15 is a flowchart showing the document selection process executed by a multifunction machine according to the second embodiment of the present invention.

In step S601, when a document name is selected in the user operation window, a selection mark "●" is displayed in the mark display column of the selected document name.

In step S602, whether application data corresponding to the selected document name exists is determined. If no application data exists (NO in step S602), the process ends. If application data exists (YES in step S602), the process advances to step S604 to hatch and display various document editing keys such as the "delete" key 537, "composite" key 538, "delete page" key 539, and "insert document" key 540. Operation to the document editing keys is inhibited, and the process ends.

A selected-document cancellation process when selection of a document is canceled in the operation window of FIG. 14 will be explained with reference to FIG. 16.

Figure 16:
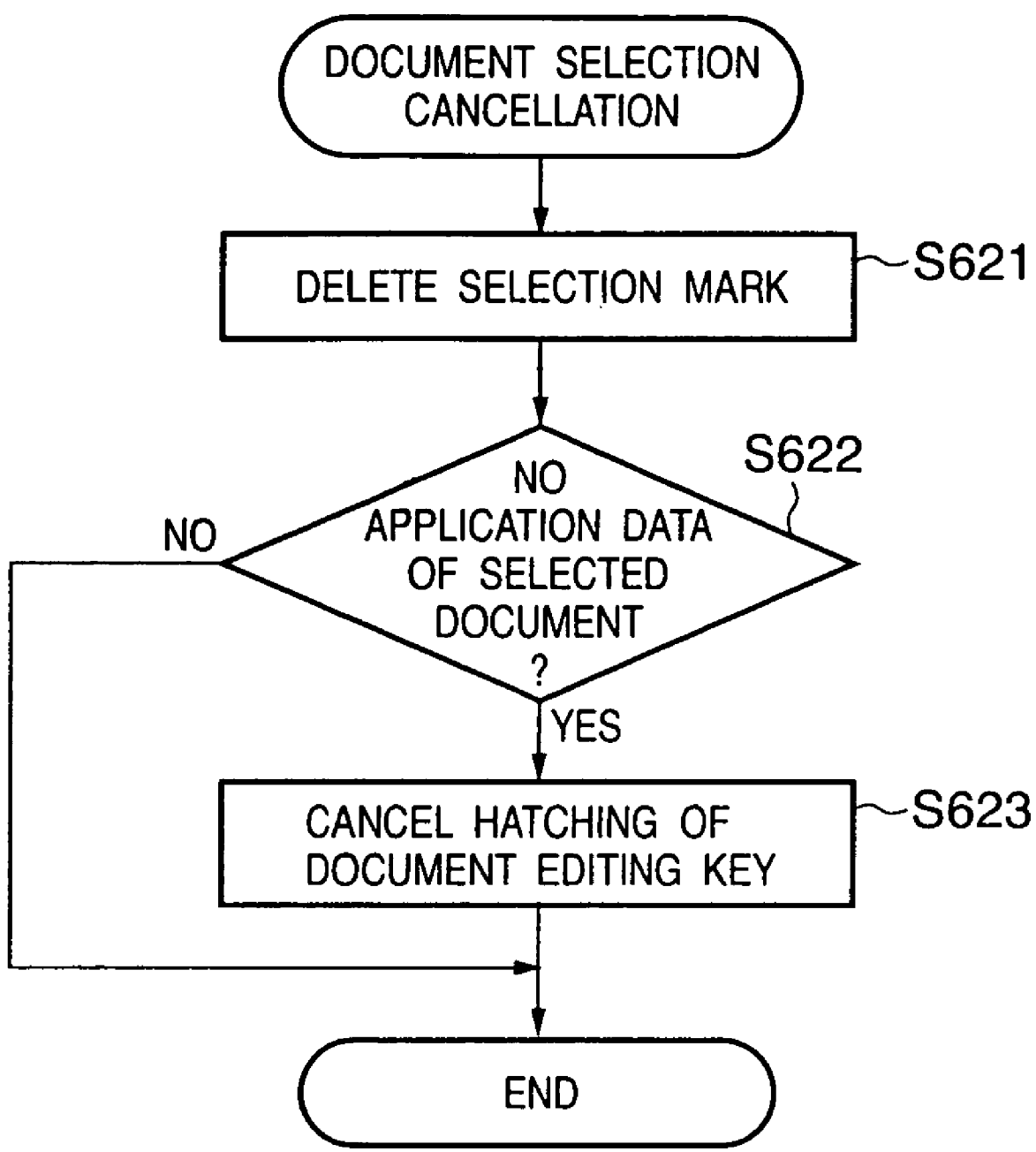
FIG. 16 is a flowchart showing a document selection cancellation process executed by the multifunction machine according to the second embodiment of the present invention.

FIG. 16 is a flowchart showing the document selection cancellation process executed by the multifunction machine according to the second embodiment of the present invention.

In step S621, the selection mark "●" in the mark display column of a selected document name is deleted (canceled). In step S622, whether application data exist for all selected document names is determined. If application data exist (YES in step S622), the process ends. If no application data exists (NO in step S622), the process advances to step S623, and the hatched display of various document editing keys such as the "delete" key 537, "composite" key 538, "delete page" key 539, and "insert document" key 540 is canceled. The display is returned to a normal display, and the process ends.

As described above, according to the second embodiment, editing operation to image data is inhibited in accordance with the management state of image data and application data, in addition to the effects described in the first embodiment. An unintended change of the management state of image data and application data by erroneous operation of the user can be avoided.

In the first and second embodiments, document editing operation to document data managed in the database is executed via the user operation window of FIG. 11 or 14 in the multifunction machine 105. However, the present invention is not limited to this. For example, the user operation window may be displayed on the PC 101 or document management server 103, and document editing operation to document data managed in the database of the multifunction machine 105 may be realized from the PC 101 or document management server 103 via the network.

The above embodiments have exemplified an example in which application data created by application software and image data obtained by rasterizing the application data into an image are managed in correspondence with each other. However, the present invention is not limited to this.

Image data rasterized into the bitmap format is received, and the feature of the image data is recognized. If the image data contains a character image, a character recognition process is performed to convert the character image into a character code. If the image data contains a figure image (line image), a vectorization process is performed to convert the figure image into vector data. The resultant data can be freely processed and edited by application software.

The obtained data and original image data are managed in correspondence with each other. The same processes as those in the embodiments are executed except the above process, and the same effects as those in the embodiments can be obtained. Corresponding image data may be obtained by rasterizing reusable data prepared in the above-mentioned manner into image data.

In any case, image data is utilized, like printing, FAX transmission, and the like. The present invention adopts two types of data: image data for immediacy, and data of a format processible by application software for reuse in processing, editing, and the like. The purpose of the present invention can be achieved by grasping the consistency between these data.

In the above embodiments, when two corresponding data become inconsistent with each other, the user is notified of this state. When these data become inconsistent with each other owing to correction of one data but become consistent again by correction of the other data, these data may be made consistent with each other.

For example, simple page deletion can be easily coped with. If the multifunction machine 105 has a more advanced editing function, the other data can be corrected for consistency.

In this case, when the multifunction machine 105 determines that two different types of data which are registered in correspondence with each other become inconsistent by correction of one data, the machine 105 determines whether the corrected contents can be reflected in the other data. If the multifunction machine 105 determines that the corrected contents can be reflected, the machine 105 inquires of the user on the UI 204 whether to correct the other data for consistency. If the user instructs the multifunction machine 105 to achieve consistency, the multifunction machine 105 corrects the other data and registers it again. If the other data cannot be corrected, the multifunction machine 105 adds information that these data are inconsistent with each other.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2003-337978 filed on Sep. 29, 2003, which is hereby incorporated by reference herein.

What is claimed is:

1. An image processing apparatus which executes a process for document data in a data management unit that manages, as the document data, at least one of application data created by application software and image data converted into a predetermined format on the basis of the application data, said apparatus comprising:

a display unit, adapted to display an operation screen containing document information on the document data managed in said data management unit and a designation portion for designating an editing operation to the document data; and an output unit, adapted to, when the editing operation to the document data for which the application data and the image data are managed as the document data is designated via the designation portion in said operation screen, output notification information representing information on consistency/inconsistency between the application data and the image data, wherein the document information contains presence/absence of the application data corresponding to the document data, presence/absence of the image data, and when both the application data and the image data exist, consistency/inconsistency between the application data and the image data.

2. The apparatus according to claim 1, wherein said output unit further outputs together with the notification information an application data operation screen for operating the application data.

3. The apparatus according to claim 1, further comprising a storage unit adapted to store said data management unit.

4. The apparatus according to claim 1, further comprising an external terminal which is connected via a network and stores said data management unit.

5. The apparatus according to claim 1, further comprising a registration unit adapted to register the application data and the image data in said data management unit in correspondence with a specific index.

6. The apparatus according to claim 1, further comprising:
an external terminal which is connected via a network and stores said data management unit; and
a registration unit adapted to register the application data and the image data via a network in said data management unit in correspondence with a specific index.

7. The apparatus according to claim 1, further comprising an inhibition unit adapted to inhibit operation of said designation portion on the basis of document information on document data to be processed in said operation screen.

8. The apparatus according to claim 7, wherein said inhibition unit controls a display form of the designation portion on the basis of the document information on the document data to be processed in said operation screen.

9. The apparatus according to claim 1, further comprising an editing unit adapted to, when either of the application data and the image data is edited on the basis of the editing operation, edit the other data so as to make the other data consistent with the edited data.

10. A method of controlling an image processing apparatus which executes a process for document data in a data management unit that manages, as the document data, at least one of application data created by application software and image data converted into a predetermined format on the basis of the application data, said method comprising:

a display step of displaying on a display unit an operation screen containing document information on the document data managed in the data management unit and a designation portion for designating an editing operation to the document data; and an output step of, when the editing operation to the document data for which the application data and the image data are managed as the document data is designated via the designation unit in the operation screen, outputting notification information representing information on consistency/inconsistency between the application data and the image data, wherein the document information contains presence/absence of the application data corresponding to the document data, presence/absence of the image data, and when both the application data and the image data exist, consistency/inconsistency between the application data and the image data.

11. A computer-readable medium storing a computer program for implementing control of an image processing apparatus which executes a process for document data in a data management unit that manages, as the document data, at least one of application data created by application software and image data converted into a predetermined format on the basis of the application data, said program comprising:

a program code for a display step of displaying on a display unit an operation screen containing document information on the document data managed in the data management unit and a designation portion for designating an editing operation to the document data; and a program code for an output step of, when the editing operation to the document data for which the application data and the image data are managed as the document data is designated via the designation unit in the operation screen, outputting notification information representing information on consistency/inconsistency between the application data and the image data, wherein the document information contains presence/absence of the application data corresponding to the document data, presence/absence of the image data, and when both the application data and the image data exist, consistency/inconsistency between the application data and the image data.

12. An image processing apparatus which executes a process for data managed in a management unit that manages, in correspondence with each other, first data of a predetermined format editable by application software and second data of a format obtained by rasterizing the first data into image data, said apparatus comprising:

a display unit, adapted to display an operation screen containing a designation portion for designating an editing operation to the first data or the second data that is managed in said management unit; and an output unit, adapted to, when editing to the first data or the second data is designated via said designation portion in said operation screen, outputting notification information representing information on consistency/inconsistency between the first data and the second data, wherein the first data contains data obtained by performing a character recognition process for a character image contained in the second data and converting the character image into a character code, or vector data obtained by performing a vectorization process for a figure image contained in the second data.

13. The apparatus according to claim 12, further comprising a storage unit adapted to store said management unit.

14. The apparatus according to claim 12, further comprising an external terminal which is connected via a network and stores said management unit.

15. The apparatus according to claim 12, further comprising a registration unit adapted to register the first data and the second data in said management unit in correspondence with a specific index.

16. The apparatus according to claim 12, further comprising an editing unit adapted to, when either of the first data and the second data is edited, editing the other data so as to make the other data consistent with the edited data.

17. A method of controlling an image processing apparatus which executes a process for data managed in a management unit that manages, in correspondence with each other, first data of a predetermined format editable by application software and second data of a format obtained by rasterizing the first data into image data, said method comprising:

a display step of displaying an operation screen containing a designation portion for designating an editing operation to the first data or the second data that is managed in the management unit; and an output step of, when editing to the first data or the second data is designated via the designation unit in the operation screen, outputting notification information representing information on consistency/inconsistency between the first data and the second data, wherein the first data contains data obtained by performing a character recognition process for a character image contained in the second data and converting the character image into a character code, or vector data obtained by performing a vectorization process for a figure image contained in the second data.

18. A computer-readable medium storing a computer program for implementing control of an image processing apparatus which executes a process for data managed in a management unit that manages, in correspondence with each other, first data of a predetermined format editable by application software and second data of a format obtained by rasterizing the first data into image data, said program comprising:

a program code for a display step of displaying an operation screen containing a designation portion for designating an editing operation to the first data or the second data that is managed in the management unit; and a program code for an output step of, when editing to the first data or the second data is designated via the designation unit in the operation screen, outputting notification information representing information on consistency/inconsistency between the first data and the second data, wherein the first data contains data obtained by performing a character recognition process for a character image contained in the second data and converting the character image into a character code, or vector data obtained by performing a vectorization process for a figure image contained in the second data.

* * * * *

UNITED STATES PATENT AND TRADEMARK OFFICE
CERTIFICATE OF CORRECTION

| | |
|---|---|
| PATENT NO. | : 7,394,560 B2 |
| APPLICATION NO. | : 10/943024 |
| DATED | : July 1, 2008 |
| INVENTOR(S) | : Nobuyuki Tonegawa |

It is certified that error appears in the above-identified patent and that said Letters Patent is hereby corrected as shown below:

COLUMN 1

Line 16, "with" should read --with the--.

COLUMN 4

Line 10, "editing" should read --edit--.

COLUMN 8

Line 6, "execute" should read --to execute a--.
    Line 19, "print" should read --to cause printing of--.

COLUMN 21

Line 1, "editing" should read --edit--.

Signed and Sealed this

Ninth Day of December, 2008

JON W. DUDAS
*Director of the United States Patent and Trademark Office*